United States Patent Office 3,178,456
Patented Apr. 13, 1965

3,178,456
19-NOR-STEROID-KETALS AND PROCESS FOR THEIR MANUFACTURE
Albert Wettstein, Riehen, Georg Anner, Basel, Hellmut Ueberwasser, Riehen, and Niklaus Tarkoey, Basel, Switzerland, assignors to Ciba Corporation, New York, N.Y., a corporation of Delaware
No Drawing. Filed June 13, 1962, Ser. No. 202,085
Claims priority, application Switzerland, June 16, 1961, 7,065/61; Aug. 10, 1961, 9,406/61; Jan. 29, 1962, 1,054/62; Mar. 7, 1962, 2,728/62
19 Claims. (Cl. 260—397.4)

The present invention provides a process for the temporary protection of the 3-oxo group in 19-nor-steroids by ketalising 5(10)-unsaturated 3-oxo-19-nor-steroids. By this process it is possible, for example, to prepare unsaturated 3-oxo-17β-hydroxy-19-nor-androstanes in excellent yields from $\Delta^{5(10)}$-3:17-dioxo-19-nor-androstenes. The said 17β-hydroxy-androstanes, for example 19-nor-testosterone and its esters and the $\Delta^{5(10)}$- or $\Delta^{4}$-3-oxo-17α-ethinyl-, -17α-trifluoropropinyl- and -17α-chloroethinyl-17β-hydroxy-19-nor-androstenes and their esters are of great thereapeutic importance by virtue of their anabolic or gestagenic action.

It is known that it is possible to protect the 3-oxo group in $\Delta^{4}$-3:17-dioxo-19-nor-androstenes by selective enol ether formation in position 3 or ketalisation, for example with ethylene glycol and pra-toluenesulfonic acid; it is however necessary with these procedures to separate the 3-mono-derivatives from other reaction products; e.g. in the last mentioned case there is obtained a mixture of products containing in addition to the 3-monoketal also the 3:17-diketal and in these products the double bond is partially in position 5(10) and partially in position 5:6.

A selective ketalisation of the 3-oxo group is known to be possible in saturated 3-oxo-steroids when it is carried out under mild conditions, for instance when the 3-oxo compound is reacted in the presence of selenious acid with a monovalent alcohol, such as methanol, but this method cannot be used with the $\Delta^{4}$-3-oxo compounds, whose oxo group does not react at all with the alcohol under such conditions.

Surprisingly, it has now been observed, that in 5:10-unsaturated 3-oxo-19-nor-steroids the 3-oxo group can be ketalised very easily, which makes it possible to achieve a selective ketalization with such compounds which have other oxo groups for instance in the 11- and/or 17- and 20-positions.

According to the new process for the temporary protection of 3-oxo group a $\Delta^{5(10)}$-3-oxo-19-nor-steroid is reacted with a lower aliphatic alcohol or monocyclic aryl-lower-aliphatic alcohol in the presence of an acid catalyst.

The process may be used for the conversion of other oxo groups present in the steroid and it is then carried out e.g. as follows: a $\Delta^{5(10)}$-3:17-dioxo-19-nor-androstene is treated with a lower aliphatic alcohol, for instance a monovalent alcohol, in the presence of an acid catalyst, the 17-oxo-group in the resulting $\Delta^{5(10)}$-3:3-dialkoxy-17-oxo-19-nor-androstene is converted to a 17β-hydroxy group, and finally the 3-ketal is hydrolyzed to the 3-ketone, if desired, before or after having esterified the 17β-hydroxyl group. The conversion of the 17-oxo compound into a 17β-hydroxy compound is carried out in known manner by reaction with a compound of the type M—X, where X represents a hydrogen atom and M represents in this case one of the groups $LiAlH_3$, $NaBH_3$, $KBH_3$ and the like, or X represents a saturated or unsaturated lower aliphatic hydrocarbon radical, if desired, substituted with halogen atoms, for example methyl, ethyl, trifluorovinyl, allyl, ethinyl, chloroethinyl, bromoethinyl, propinyl or trifluoropropinyl groups and in this case M stands for MgBr, MgI, MgCl or an alkali metal.

The ketalization according to the present process is carried out with the use of lower aliphatic or monocylic-aryl-lower-aliphatic alcohols. By the term "lower-aliphatic" there are intended hydrocarbon radicals having from about 1–7 carbon atoms, preferably 1–5. There can be used monohydric or dihydric, preferably primary, alcohols, more especially methanol, ethanol, n-propanol, n-butanol or ethylene glycol, 1:3-propanediol, 1:2-propanediol or benzyl alcohol. It is of advantage to use the alcohol at the same time as solvent. Suitable catalysts are, for example, weak acids, more especially those of a $p_{KMCS}$ value ranging from 3 to 7 ($p_{KMCS}$ indicates the $p_K$ value in a mixture of 80% by weight or methyl cellosolve and 20% by weight of water), for example carboxylic acids such as oxalic, chloroacetic, malonic, succinic, acetoacetic, benzoic, para-chlorobenzoic, paranitrobenzoic, acetic, propionic, methoxyacetic, phenylacetic, glycolic, pyruvic, mesoxalic, maleic, fumaric or phthalic acid. Further suitable as catalysts are weak inorganic acids, for example, selenious acid or ammonium nitrate. When these acids are used in a suitable concentration, they do not isomerise the $\Delta^{5(10)}$-3-ketones to $\Delta^{4}$-3-ketones. Other suitable catalysts are strong acids, for example mineral acids or sulfonic acids, for example sulfuric, hydrobromic, hydrochloric, perchloric, per-iodic, para-toluene-sulfonic, para-bromobenzenesulfonic acids and the like. When one of these acids is used, the ketalisation proceeds very rapidly, in fact more rapidly than the displacement of the double bond and the back-cleavage of the ketal, so that even after a short time the $\Delta^{5(10)}$-3-ketals are obtained in a high yield. By immediate addition of a base and/or precipitation of the reaction product, the reaction can be discontinued when a maximum amount of ketal has been formed. The ketals of the $\Delta^{5(10)}$-3-oxo-steroids obtained by the present process are stable towards alkaline reagents. Thus, for example, any further oxo groups present—for example in position 11 and/or 17 or 20—can be reduced with complex metal hydride such as lithium aluminum hydride, sodium borohydride or the like in known manner to hydroxyl groups. A 17-oxo-group present in a 3-ketal can however also be reacted with alkyl, alkenyl or alkinyl metal compounds, which may also be halogenated, for instance, with methyl magnesium iodide, methyl magnesium bromide, methyl lithium, with sodium, potassium or lithium-acetylide, methyl-acetylide or chloro-acetylide, with allyl magnesium halogenides, trifluoropropinyl magnesium halogenides or trifluorovinyl magnesium halogenides. There are thus obtained the corresponding 17α-methyl-, 17α-trifluorovinyl-, 17α-allyl-, 17α-ethinyl-, 17α-chloroethinyl- or 17α-propinyl- and 17α-trifluoropropinyl-17β-hydroxy-19-nor-androstenes, which can then also, if desired, be converted to the corresponding 17β-acyloxy compounds.

When the $\Delta^{5(10)}$-3-ketals prepared by the present process are subjected to acid hydrolysis, there are obtained— depending on the acid concentration, the strength of the acid, the reaction temperature and reaction time—either $\Delta^{5(10)}$- or $\Delta^{4(5)}$-3-oxo-19-nor-steroids. While, when a mineral acid is used, only the latter compounds are formed, it is possible to prepare with carboxylic $\Delta^{5(10)}$-3-oxo-19-nor-steroids, more especially at a temperature below 50° C. and in a dilute solution.

Prior or subsequent to the splitting of the ketal group, a 17β-hydroxyl group can, if desired, be esterified in a manner known per se. There are thus obtained the 17β-acyloxy derivatives of the 3-ketals or 3-ketones respectively.

The present invention further includes $\Delta^{5(10)}$-3:3-dialkoxy-19-nor-steroids, more especially those of the pregnane and androstane series, in which the alkoxy radicals contain 1–5 carbon atoms and which may be linked with one another (cyclic ketals). As specific compounds there may be mentioned $\Delta^{5(10)}$-3:3-dialkoxy-17$\beta$-hydroxy-androstenes and their esters that contain in position 17$\alpha$ a hydrogen atom or a saturated or unsaturated hydrocarbon radical with 1–5 carbon atoms, which may be, if desired, halogenated, for example $\Delta^{5(10)}$-3:3-dialkoxy-17$\beta$-hydroxy-17$\alpha$-ethinyl-, -17$\alpha$-chloroethinyl-, -17$\alpha$-vinyl-, -17$\alpha$-trifluorovinyl-, -17$\alpha$-allyl-, -17$\alpha$-propinyl-, -17$\alpha$-trifluoropropinyl-, -17$\alpha$-methyl-, -17$\alpha$-ethyl-, -17$\alpha$-isopropyl-19-nor-androstenes and their esters, as well as $\Delta^{5(10)}$-3:3-dialkoxy-17$\beta$-hydroxy-androstenes and their esters. These ketals are easy to split up, whereupon they form corresponding $\Delta^4$-3-ketones and $\Delta^{5(10)}$-3-ketones, for example the physiologically active known substances mentioned above.

The acid radical in the esters referred to above are more especially those of aliphatic, cycloaliphatic, araliphatic and aromatic and heterocyclic carboxylic acids containing 1–15 carbon atoms, for example, formates, acetates, propionates, butyrates, trimethyl acetates, oenanthates, caproates, decanoates, cyclopentylpropionates, valerates, benzoates, furoates, hexahydrobenzoates, phenylproprionates, trifluoroacetates and the like.

The $\Delta^{5(10)}$-3-oxo-steroids used as starting materials in the present process can be prepared in known manner from $\Delta^{1,3,5(10)}$-3-alkoxy-steroids by reduction with an alkali metal and liquid ammonia or an amine, whereby a $\Delta^{2,5(10)}$-3-alkoxy-steroid is produced which is then subjected to mild acid hydrolysis. Alternatively, the $\Delta^{5(10)}$-3-ketones are accessible by decarboxylating $\Delta^4$-3-oxo-steroid-19-acids, for example by heating in pyridine.

The following examples illustrate the invention.

*Example 1*

1 gram of $\Delta^{5(10)}$-3:17-dioxo-19-nor-androstene is added to a solution of 0.5 gram of malonic acid in 15 cc. of methanol, the whole is stirred until a complete solution has been obtained and the latter is then kept for 4–5 hours at 20–25° C., then cooled to 0° C.; the reaction mixture is rendered alkaline with excess cold aqueous sodium bicarbonate solution and agitated with ether. The ether extracts are washed with sodium bicarbonate solution and dried with sodium sulfate. Evaporation in a water-jet vacuum yields 1.08 grams of $\Delta^{5(10)}$-3:3-dimethoxy-17-oxo-19-nor-androstene which, after recrystallization from n-heptane, melts at 115–116° C.; its infra-red spectrum in methylene chloride solution displays characteristic bands at 5.8, 9.0, 9.2, 9.5 and 9.9$\mu$.

*Example 2*

When 1 gram of $\Delta^{5(10)}$-3:17-dioxo-19-nor-androstene is reacted as described in Example 1, there is obtained a substantially quantitative yield of $\Delta^{5(10)}$-3:3-dimethoxy-17-oxo-19-nor-androstene by using instead of malonic acid one of the following catalysts and reaction times:

| Catalyst: | Reaction time |
|---|---|
| Oxalic acid, 0.5 gram | minutes 15–30 |
| Monochloroacetic acid, 0.5 gram | hours 4–5 |
| Acetic acid, 0.5 gram | do 20–24 |
| Selenium dioxide, 1 gram | do 5–6 |
| Ammonium nitrate, 0.11 gram | do 30–40 |

*Example 3*

A solution of 3.68 grams of $\Delta^{5(10)}$-3:3-dimethyoxy-17-oxo-19-nor-androstene in 280 cc. of ether and 20 cc. of toluene is saturated with acetylene gas at 0° C., and in the course of 20 minutes at −10 to 0° C. 60 cc. of a 1.8 N-solution of sodium tertiary amylate in tertiary amyl alcohol are added dropwise, whereupon a weak current of acetylene gas is passed for 15 hours at 0–3° C. The reaction mixture is poured into 400 cc. of an ammonium chloride solution of 20% strength previously cooled to −5° C., the mixture is stirred for a short time in a separating funnel and the aqueous layer is separated and extracted with ether. The organic solutions are washed with ice-cold ammonium chloride solution, dried with sodium sulfate and evaporated in a water-jet vacuum, to yield 4.6 grams of crude amorphous $\Delta^{5(10)}$-3:3-dimethoxy-17$\alpha$-ethinyl-17$\beta$-hydroxy-19-nor-androstene which displays in the infra-red spectrum in methylene chloride solution characteristic bands at 2.75, 3.0, 6.9, 7.25, 7.35, 7.5, 9.0, 9.15, 9.5, 9.8, 10.8 and 11.85$\mu$.

A solution of this crude product in 100 cc. of acetone is mixed at room temperature with a solution of 2 grams of malonic acid in 30 cc. of water and 100 cc. of acetone. The mixture is kept for 3 hours at 20–24° C., diluted with 600 cc. of benzene and 200 cc. of sodium bicarbonate solution of 10% strength, separated, and the aqueous layer is extracted with benzene. The organic solutions are washed with 50 cc. of sodium bicarbonate solution, dried with sodium sulfate and evaporated in a water-jet vacuum, to yield 3.6 grams of crude product which, on addition of a small amount of ether, yields 3.2 grams of crystalline $\Delta^{5(10)}$-3-oxo-17$\alpha$-ethinyl-17$\beta$-hydroxy-19-nor-androstene melting at 175–180° C. After recrystallization from methanol it melts at 180–181.5°.

*Example 4*

A mixture of 5 grams of $\Delta^{5(10)}$-3:3-dimethoxy-17-oxo-19-nor-androstene, 60 cc. of methanol and 1 cc. of pyridine is treated under nitrogen at 20–28° C., with 4 grams of sodium borohydride in 80 cc. of methanol and heated for 30 minutes at the boil and then cooled to 40° C. A solution of 1.6 grams of potassium hydroxide in 10 cc. of water is run in and the whole is heated for 10 minutes at the boil, allowed to cool, diluted with 400 cc. of benzene, separated, the aqueous layers are extracted with benzene and the organic solutions are washed three times with 100 cc. of water on each occasion. The combined organic solutions are repeatedly dried with potassium carbonate and evaporated in a water-jet vacuum, to yield crude $\Delta^{5(10)}$-3:3-dimethoxy-17$\beta$-hydroxy-19-nor-androstene which shows in its infra-red spectrum in methylene chloride solution inter alia bands at 2.77, 7.4, 8.65, 9.0, 9.16, 9.50, 10.2 and 11.85$\mu$. After recrystallization from ether+heptane it melts at 112–113° C.

The product is dissolved in 20 cc. of pyridine, treated with 10 grams of finely powdered potassium bicarbonate and esterified at 10° C. with 5 cc. of caprylchloride. The mixture is stirred for 48 hours at room temperature, diluted with ether and stirred into a mixture of ice and sodium bicarbonate solution. The organic solution is separated, the aqueous phase extracted with ether, the combined organic solutions dried over sodium sulfate and freed from capric acid dissolved in it by filtration through a column of 150 grams of alumina. On evaporation in a water-jet vacuum the filtrate yields $\Delta^{5(10)}$-3:3-dimethoxy-17$\beta$-decanoyloxy-19-nor-androstene as an almost colourless oil which is dissolved in 100 cc. of acetone and mixed at 10° C. with 10 cc. of cooled 2 N-hydrochloric acid. The mixture is kept for 30 minutes at 10° C., diluted with benzene, and the organic layer is repeatedly washed with dilute hydrochloric acid and then with ice-cold sodium bicarbonate solution. The benzene solution is repeatedly dried with sodium sulfate, evaporated in a water-jet vacuum, and the residue is dried in a high vacuum to yield 19-nor-testosterone-17-decanoate as an almost colourless oil; on addition of 1 cc. of n-pentane it crystallises at −8° C. and after recrystallization from 5 cc. of n-pentane at −8° C. it forms colourless crystals melting at 38 to 39° C.

*Example 5*

0.05 cc. of concentrated sulfuric acid are vigorously stirred into a suspension of 10.0 grams of $\Delta^{5(10)}$-3:17-dioxo-19-nor-androstene in 130 cc. of anhydrous methanol. After a short time a clear solution is obtained which, after 5 minutes have elapsed since the addition of acid, is treated with 0.25 cc. of 10 N-sodium hydroxide solution. The reaction product is then precipitated with 230 cc. of water and filtered off. The filter residue is washed with water and dried, to yield 10.1 grams of $\Delta^{5(10)}$-3:3-dimethoxy-17-oxo-19-nor-androstene melting at 112–113° C.

Instead of sulfuric acid an equivalent amount of hydrobromic acid in glacial acetic acid or paratoluenesulfonic acid may be used.

Example 6

A suspension of 22.9 grams of $\Delta^{5(10)}$-3:17-dioxo-19-nor-androstene in a mixture of 230 cc. of methanol and 69 cc. of dioxane is cooled to −15° C., and 0.18 cc. of concentrated sulfuric acid is stirred in. After about 15 minutes a clear solution is obtained and after about 25 minutes the reaction product begins to settle out. The mixture is allowed to react for 30 minutes at −15° C. and then alkalinised with 1.8 cc. of 10 N-sodium hydroxide solution. The mixture is then stirred for 20 minutes without cooling, and the reaction product is precipitated with 600 cc. of water, filtered off, and washed with water. When the product is dried in a water-jet vacuum at 60° C., it yields 24.05 grams of pure $\Delta^{5(10)}$-3:3-dimethoxy-17-oxo-19-nor-androstene melting at 112–113° C.

The aqueous filtrates are extracted with methylene chloride and the extracts are washed with water, dried and evaporated. The residue (1.99 grams) is dissolved in benzene and the solution is filtered through a column of 20 grams of silica gel. 100 cc. of a 9:1 mixture of benzene+ethyl acetate elute 0.467 gram of a mixture which is once more treated with methanol and sulfuric acid as described above. In this manner another 0.389 gram of pure $\Delta^{5(10)}$-3:3-dimethoxy-17-oxo-19-nor-androstene is obtained.

Example 7

3.18 grams of $\Delta^{5(10)}$-3:3-dimethoxy-17-oxo-19-nor-androstene are dissolved in 100 cc. of tetrahydrofuran and 150 cc. of ether and this solution is added dropwise with stirring to a solution of trifluoropropinyl-magnesium-bromide in 150 cc. of tetrahydrofuran (prepared by treating the Grignard compound obtained from 250 mg. of magnesium and ethyl bromide with an excess of trifluoromethylacetylene). The reaction mixture is heated to the boil for a short time and then stirred at 25° C. for two hours; it is then diluted with 300 cc. of ether and the mixture is well stirred. The aqueous layer is then separated and extracted twice with a mixture of ether-methylene chloride (5:1). The organic solutions are washed with cold ammonium chloride solution, dried with sodium sulfate and evaporated in a vacuum. The crude $\Delta^{5(10)}$-3:3-dimethoxy-17α-trifluoropropinyl-17β-hydroxy-19-nor-androstene thus obtained is dissolved in 100 cc. of acetone and kept for 2.5 hours at room temperature after having added a solution of 1.8 grams of malonic acid in 25 cc. of water and 85 cc. of acetone. The mixture is then diluted with benzene and the organic phase is washed consecutively with saturated sodium bicarbonate solution and water. The dried solution yields after evaporation in vacuum 2.95 grams of $\Delta^{5(10)}$-3-oxo-17α-trifluoro-propinyl-17β-hydroxy-19-nor-androstene, which crystallizes from methylene chloride-hexane and then melts at 138–140° C. If there is used p-toluene sulfonic acid in acetone for the ketal splitting, there is obtained in good yields $\Delta^4$-3-oxo-17α-trifluoropropinyl-17β-hydroxy-19-nor-androstene melting at 125–127° C.

Example 8

From 1.5 grams of $\Delta^{5(10)}$-3:3-dimethoxy-17-oxo-19-nor-androstene there is obtained by treatment with trifluorovinyl-magnesiumbromide under the conditions specified in Example 7 the $\Delta^{5(10)}$-3:3-dimethoxy-17α-trifluorovinyl-17β-hydroxy-18-nor-androstene, which may be converted to $\Delta^4$-3-oxo-17α-trifluorovinyl-17β-hydroxy-19-nor-androstene melting at 175–177° C.

By treating $\Delta^{5(10)}$-3:3-dimethyl-17-oxo-19-nor-androstene with lithium-chloroacetylide there is obtained after ketal splitting by the aid of malonic acid in acetone the $\Delta^{5(10)}$-3-oxo-17α-chloroethinyl-17β-hydroxy-19 - nor - androstene, which can then be isomerized to yield the $\Delta^4$-3-oxo-17α-chloroethinyl-17β-hydroxy-19 - nor - androstene of melting point 200–201° C.

Example 9

3.52 grams of the $\Delta^{5(10)}$-3:3-dimethoxy-17b-hydroxy-17α-ethinyl-19-nor-androstene are refluxed in a solution of 15 cc. of pyridine and 15 cc. of acetic acid anhydride for 12 hours. The cooled reaction solution is evaporated in vacuum, the residue is taken up in ether-methylene chloride-5:1-mixture and washed with dilute surfuric acid, sodium bicarbonate solution and water until neutral. After having been dried, the ethereal solution is evaporated in vacuum and there are obtained 3.64 grams of $\Delta^{5(10)}$-3:3-dimethoxy-17β-acetoxy-17α - ethinyl - 19 - nor-androstene. The ketal is split by mild hydrolysis with malonic acid in acetone to yield the $\Delta^{5(10)}$-3-oxo-17β-acetoxy-17α-ethinyl-19-nor-androstene or by treatment with p-toluenesulfonic acid in acetone at 20° C. to yield $\Delta^4$-3-oxo-17β-acetoxy-17α - ethinyl - 19 - nor - androstene, which melts at 161–162° C.

What is claimed is:

1. Process for the manufacture of 3-mono-ketals of $\Delta^{5(10)}$-3-oxo-19-nor-steroids, wherein a $\Delta^{5(10)}$-3-oxo-19-nor-steroid containing at least one additional oxo group, is treated with a member selected from the group consisting of a lower aliphatic alcohol and a monocyclic-aryl-lower aliphatic alcohol in the presence of an acidic medium selected from the group consisting of oxalic acid, a mineral acid and an organic sulfonic acid.

2. Process as claimed in claim 1, wherein there is used methanol as the lower aliphatic alcohol.

3. In a process for the synthesis of ring A unsaturated 3-oxo-19-nor-steroids, the step of temporarily protecting in a $\Delta^{5(10)}$-3-oxo-19-nor-steroid having at least one additional oxo group, by treating said 3-ketone with a member selected from the group consisting of a lower aliphatic alcohol and a monocyclic-aryl-lower aliphatic alcohol in the presence of an acidic medium selected from the group consisting of oxalic acid, a mineral acid and an organic sulfonic acid, converting the second oxo group into a member selected from the group consisting of a hydroxy and acyloxy group, and splitting in the so obtained 3-ketals the ketal group by an acidic treatment.

4. Process for the temporary selective protection of the 3-oxo group in $\Delta^{5(10)}$ - 3:17 - dioxo-19-nor-androstene, wherein this compound is treated with a member selected from the group consisting of a lower aliphatic alcohol and a monocyclic-aryl-lower-aliphatic alcohol in the presence of an acidic catalyst selected from the group consisting of oxalic acid, a mineral acid and an organic sulfonic acid, in the so obtained 3-ketal the 17-oxo group is reduced to a 17β-hydroxy group and the 3-ketal group is split by an acidic treatment.

5. Process for the temporary selective protection of the 3-oxo group in $\Delta^{5(10)}$-3:17-dioxo - 19 - nor - androstene, wherein this compound is treated with a member selected from the group consisting of a lower aliphatic alcohol and a monocyclic aryl-lower-aliphatic alcohol in the presence of an acidic catalyst selected from the group consisting of oxalic acid, a mineral acid and an organic sulfonic acid, in the so obtained 3-ketal the 17-oxo group is reduced with a complex light metal hydride to the 17β-hydroxy group, this group is esterified and the ketal group in position 3 is then split by the aid of an acidic agent.

6. Process for the temporary selective protection of the 3-oxo group in $\Delta^{5(10)}$-3:17-dioxo - 19 - nor - androstene, wherein this compound is treated with a member selected from the group consisting of a lower aliphatic alcohol and a monocyclic aryl-lower-aliphatic alcohol in the presence of an acidic catalyst selected from the group consisting of oxalic acid, a mineral acid and an organic sulfonic acid, the so obtained 3-ketal is treated with a hydrocarbon-metal compound and in the so obtained derivative having a hydrocarbon radical in the 17α-position together with a 17β-hydroxy group, the 3-ketal is split by an acidic treatment.

7. Process according to claim 6, in which there is used as a hydrocarbon metal compound a saturated aliphatic hydrocarbon alkali metal compound.

8. Process according to claim 6, in which there is used as a hydrocarbon metal compound an unsaturated aliphatic hydrocarbon alkali metal compound.

9. Process according to claim 6, in which there is used as a hydrocarbon metal compound a halogenated aliphatic hydrocarbon metal compound.

10. $\Delta^{5(10)}$-3:3-di-lower alkoxy-17-R-19-nor-androstene, in which R represents a member selected from the group consisting of an oxo group, a hydrogen atom together with a β-hydroxy group and a hydrogen atom together with a β-acyloxy group of a carboxylic acid containing 1–15 carbon atoms.

11. A member selected from the group consisting of $\Delta^{5(10)}$-3:3-di-lower alkoxy-17β-hydroxy-19-nor-androstene and an ester of a carboxylic acid containing 1–15 carbon atoms thereof.

12. A member selected from the group consisting of $\Delta^{5(10)}$-3:3-di-lower alkoxy-17β-hydroxy-19-nor-androstene and an ester of a carboxylic acid containing 1–15 carbon atoms thereof, and which have in the 17α-position a member selected from the group consisting of a saturated and an unsaturated aliphatic hydrocarbon radical having from 1 to 5 carbon atoms.

13. A member selected from the group consisting of $\Delta^{5(10)}$-3:3-dimethoxy-17α-ethinyl-17β - hydroxy - 19 - nor-androstene and its esters of a carboxylic acid containing 1–15 carbon atoms.

14. A member selected from the group consisting of $\Delta^{5(10)}$-3:3-dimethoxy-17α-methyl-17β - hydroxy - 19 - nor-androstene and its esters of a carboxylic acid containing 1–15 carbon atoms.

15. A member selected from the group consisting of $\Delta^{5(10)}$-3:3-dimethoxy-17α-chloroethinyl-17β-hydroxy - 19-nor-androstene and its esters of a carboxylic acid containing 1–15 carbon atoms.

16. A member selected from the group consisting of $\Delta^{5(10)}$-3:3-dimethoxy-17α-trifluoropropinyl - 17β-hydroxy-19-nor-androstene and its esters of a carboxylic acid containing 1–15 carbon atoms.

17. A member selected from the group consisting of $\Delta^{5(10)}$-3:3-dimethoxy-17α-trifluorovinyl - 17β-hydroxy - 19-nor-androstene and its esters of a carboxylic acid containing 1–15 carbon atoms.

18. $\Delta^{5(10)}$-3:3-dimethoxy-17α-ethinyl-17β - acetoxy - 19-nor-androstene.

19. $\Delta^{5(10)}$-3:3-dimethoxy-17-oxo-19-nor-androstene.

References Cited by the Examiner
UNITED STATES PATENTS

| | | | |
|---|---|---|---|
| 2,773,888 | 12/56 | Oliveto et al. | 260—397.45 |
| 2,927,921 | 3/60 | Oliveto et al. | 260—239.55 |
| 3,014,933 | 12/61 | Rao | 260—397.4 |
| 3,032,552 | 5/62 | Ringold et al. | 260—239.55 |
| 3,058,976 | 10/62 | Patchett | 260—239.57 |
| 3,067,214 | 12/62 | Oberster et al. | 260—397.4 |
| 3,069,421 | 12/62 | Nomine et al. | 260—239.55 |

LEWIS GOTTS, *Primary Examiner.*
WALTER A. MODANCE, *Examiner.*